United States Patent [19]
Iwabuchi

[11] Patent Number: 5,678,595
[45] Date of Patent: Oct. 21, 1997

[54] VACUUM EXHAUST VALVE

[75] Inventor: Toshiaki Iwabuchi, Yabutsukahonmachi, Japan

[73] Assignee: Benkan Corporation, Tokyo, Japan

[21] Appl. No.: 576,586

[22] Filed: Dec. 21, 1995

[51] Int. Cl.[6] ............................................. F16K 49/00
[52] U.S. Cl. ........................ 137/341; 251/335.3; 251/63.5
[58] Field of Search ..................................... 251/335.3, 62, 251/63.5; 137/341

[56] References Cited

U.S. PATENT DOCUMENTS

| | | | |
|---|---|---|---|
| 3,110,319 | 11/1963 | Arata et al. | 137/341 |
| 3,178,913 | 4/1965 | Olson | 137/341 |
| 3,605,795 | 9/1971 | Rajakovics | 137/341 |
| 3,818,930 | 6/1974 | Crum et al. | 137/341 |
| 4,447,707 | 5/1984 | Baker | 137/341 |
| 4,687,017 | 8/1987 | Danko et al. | 251/335.3 |
| 5,363,872 | 11/1994 | Lorimer | 251/335.3 |
| 5,558,717 | 9/1996 | Zhao et al. | 118/715 |

*Primary Examiner*—A. Michael Chambers
*Attorney, Agent, or Firm*—Eric P. Schellin

[57] ABSTRACT

An improved vacuum exhaust valve is disclosed for vacuum-operated exhaust lines of chemical vapor deposition equipment, which includes a sheathed heater made of hollow metal tube spirally formed into a coil and heating wire inserted into the spiral tube, the sheathed heater being mounted to sealingly shroud a reciprocally disposed valve disk. The sheathed heater is provided inside a bellows that is mounted to shield the core valve portion against the flow of chemical vapor flowing through the valve disk. Also, the sheathed heater is vertically expandably disposed for synchronization with the vertical movement of the valve disk as the latter is driven by an actuator to move into abutting contact or away from a valve seat between an inlet port and outlet port. In addition, a thermocouple is mounted inside the sheathed heater for measuring the temperature of the latter and operatively connected to a temperature control device for controlling the sheathed heater. With this arrangement, the temperature of the bellows, valve disk and valve seat is kept at a predetermined stable temperature range so as to minimize adhesion or deposition of chemical substance to their surfaces.

4 Claims, 6 Drawing Sheets

VACUUM EXHAUST VALVE

BACKGROUND OF THE INVENTION

1) Field of the Invention

This invention relates in general to a vacuum exhaust valve for chemical vapor deposition (CVD) equipment, and particularly to an improved vacuum exhaust valve for use in vacuum-operated exhaust systems of CVD.

2) Description of the Prior Art

A typical vacuum exhaust valve incorporated in vacuum-operated exhaust systems of chemical vapor deposition (CVD) equipment is depicted in FIG. 6, which draws, by vacuum suction, chemical vapor from a CVD exhaust waste line, which vapor leaves the valve into a vacuum pump.

The valve comprises a valve casing 3 in which a vertically movably disposed valve disk 5 is operated by an actuator 4 that is mounted in an upper part of the valve casing 3. Provided at one side of the valve casing 3 is a fluid inlet port 1 from which chemical vapor enters the valve casing 3 and exit through a fluid outlet port 2 that is formed at a lower part of the casing 3. The valve disk 5, mounted between the inlet and outlet ports 1 and 2, moves between two vertical positions; an upper position where the valve stands from a valve seat 7 and a lower position where the valve is pressed against the valve seat 7.

The actuator 4 drives the valve disk 5 downward into contact with the valve seat 7 thereby blocking the flow of chemical vapor between the inlet and outlet ports 1 and 2. The downward movement of the valve disk 5 into contact with the valve seat 7 re-establishes a fluid-flow relationship between the ports 1 and 2. The valve disk 5 has a lower portion thereof fitted with a gasket 8 made of fluoroelastomer rubber to secure a fluid-tight sealing when the valve disk 5 is abuttingly pressed against the valve seat 7 in its closing position.

A bellows 6 is mounted in the valve casing 3, which sealingly encloses the connecting section for protection of valve core parts against possible objectionable impacts of the sucked-in chemical vapor, such as adhesion and deposition of chemical substance in the surfaces of the valve disk 5 and gasket 8. The bellows 6 is movably disposed to expand and contract in union with the back-and-forth movement of the valve as it is driven by the actuator 4.

In a CVD equipment, reactant gas is used to deposit film on device wafers to propel the reaction in gas phase, where the gas is heated to a temparature range between 400° and 500° C. and kept at a pressure range between $10^{-5}$ and $10^{-6}$ Pa. The chemical vapor flowing through the vacuum exhaust valve is caused to deposit upon the connecting section and other core parts of the valve.

These conventional vacuum exhaust valves have been found to pose various problems.

When the temperature of the chemical vapor flowing through the valve is below 130° C., it often happens that some chemical substances adhere to and deposits in the exposed surfaces of the valve, including the valve seat 7, the gasket 8 and the bellows 6. These deposits come in the way when the valve disk 5 is pressed against the seat 7 to close the valve, and prevent fluid-tight sealing, resulting in leakage.

Because of this, the valve has to be frequently stopped to clean with chemical agents and remove the deposits adhered to its surfaces. Furthermore, the valve components, including the bellows 6, tend to shorten their service live from exposure to such deposition and constant cleansing with chemical agents.

A conventional solution to this problem is to use a heating system, such a rubber heater 21 as shown in FIG. 6. The rubber heater 21 is set to generate heat at around 150° C., the upper limit of use for the fluoroelastomer gaskets 8.

However, it has been found that this method failed to offer the desired effects. The rubber heater 21, while capable of maintaining a temperature of 150° C. about valve external surfaces, could only keep the internal surface at about 80° C., because of a temperature drop between the valve external and internal surfaces, well below a level that insures prevention of chemical adhesion and deposition. When the inside pressure of the valve casing 3 drops close to a vacuum state, the inside temperature of the valve declines further.

SUMMARY OF THE INVENTION

The present invention has been proposed to eliminate these and other drawbacks of the prior art vacuum exhaust valves for CVD exhaust systems.

It is therefore a primary object of the present invention to provide an improved vacuum exhaust valve which can be kept at a stable temperature range that prevents adherence or deposition of chemical substances in its surfaces.

It is another object of this invention to provide such a valve in which a sheathed heater is installed inside the bellows around the valve disk. The sheathed heater is provided to sealingly house the valve disk and permits setting to generate a predetermined temperature for the bellows and valve disk. This arrangement is provided to enhance the performance of the valve in which the bellows is subjected to stable heating in its expansion and contraction in unison with the vertical movement of the valve disk operated by the actuator.

It is a further object to provide such a valve in which a temperature control device including a sheathed thermocouple is mounted inside the sheathed heater to enhance the temperature control of the valve. This addition of the temperature control device is provided to minimize adhesion or deposition of chemical substances at the surfaces of the valve disk and the bellows, thus helping these valve components increase their operating performance and service life.

A still further object is to provide such a valve in which the sheathed heater is made of metal tube coiled into a spiral configuration, with a length of heating wire inserted into the tube, so that the heater is capable of expansion and contraction in axial direction in synchronization with the vertical movement of the valve disk. This arrangement is provided to reduce wear and tear of the heating wire from use.

A still another object is to provide such a valve in which a rubber heater is mounted around the valve body, which keeps the valve heated in conjunction with a temperature control device operatively connected with the rubber heater.

BRIEF EXPLANATION OF THE ACCOMPANYING DRAWINGS

DETAILED DESCRIPTION OF THE PREFERRED EMBODIMENTS

Figure 1:
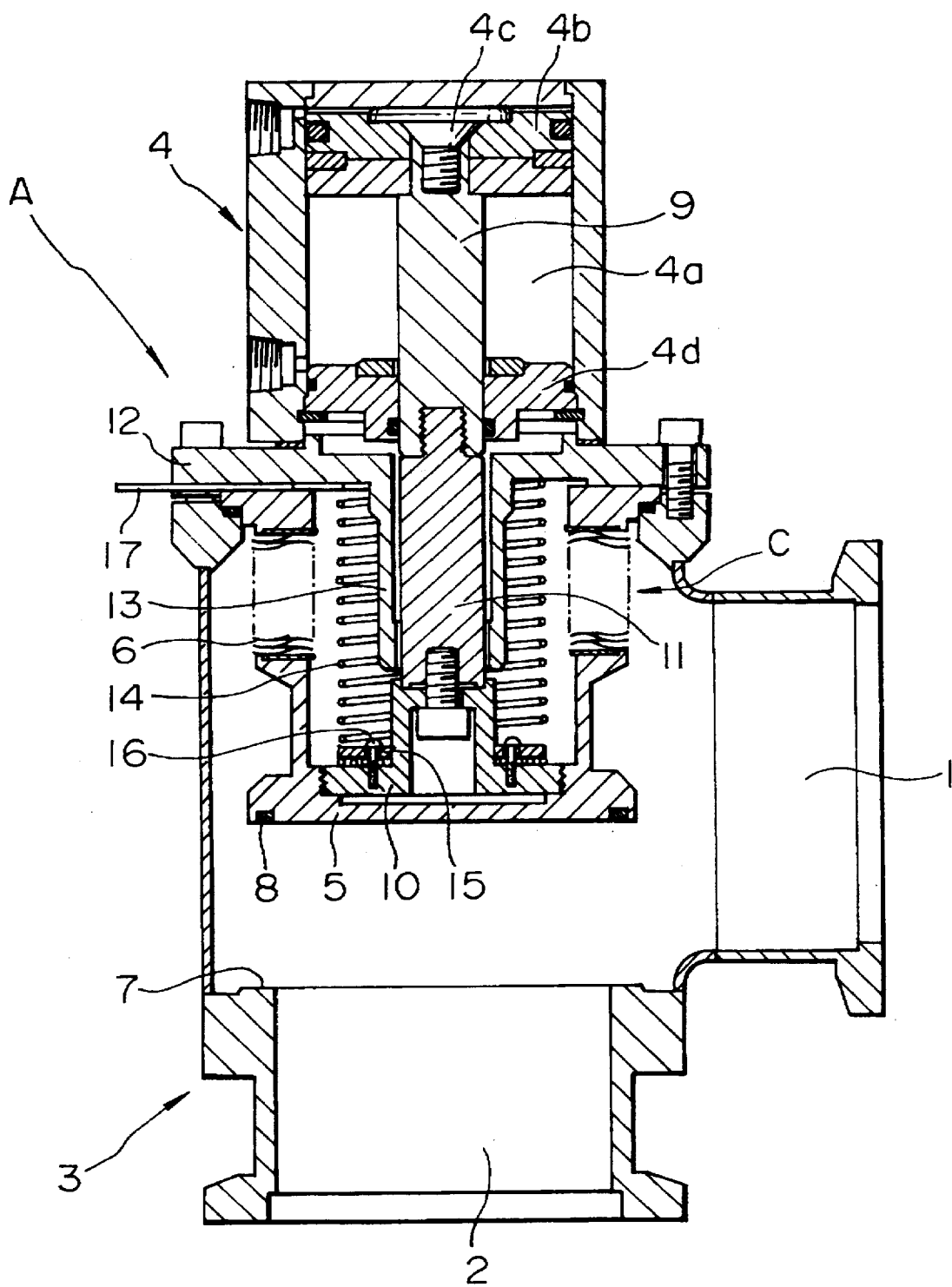
FIG. 1 is a cross-sectional side view of the vacuum exhaust valve, in its open position, constructed according to a first preferred embodiment of the present invention.

Preferred embodiments of the vacuum exhaust valve A constructed in accordance with the present invention will be explained in full detail in conjunction with the attached drawings. In a first preferred embodiment, as shown in FIG. 1, a valve casing 3 has a fluid inlet port 1 mounted on one side thereof and a fluid outlet port 2 at a lower end of the valve casing 3. The inlet port 1 is connected for drawing chemical vapor from a source, not shown, into the valve A, with the vapor being caused to leave the valve casing 3 through the outlet port 2 by vacuum-induced suction.

Provided on top of the valve casing 3 is an actuator 4 which is provided to drive a connecting section C that forms an upper part of the valve casing 3. The connecting section C includes a reciprocating valve disk 5 which is moved vertically by a piston rod 9 and a connecting rod 11 in an actuator 4 toward and away from an annular valve seat 7 that is formed at an upper end of the outlet port 2.

The connecting section C has a vertically mounted bellows 6 that is secured at an upper periphery thereof to a fixed position in the connecting section. The bellows 6 is provided to protect core parts of the connecting section C, including the valve disk 5, against undesirable effects of the chemical vapor flowing through the valve A. The bellows 6 expands and contracts in union with the connection section as it is driven back and forth relative to the valve seat 7. The valve disk 5 is fitted at a lower end thereof with a ring gasket 8, which may preferably be made of fluoroelastomer rubber. The gasket 8 is provided to secure fluid-tight sealing relationship with the valve seat 7 when the valve disk 5 is pressed against the valve seat 7 to effectively close the flow of chemical vapor between the inlet and outlet ports 1 and 2.

The piston rod 9 is vertically movably mounted in the actuator 4 and is rigidly connected end-to-end to a connecting rod 11 for interlocked movement to drive the valve disk 5.

The vacuum exhaust valve A also includes a cover flange 12 that caps the connecting section C, a vertical sleeve 13 that is fixedly secured at an upper periphery to the flange 12 and houses the movable connecting rod 11, and a spirally shaped sheathed heater 14 via a heater base 10 mounted between the circular sleeve and the bellows 6. The sheathed heater 14 is a hollow metal tube formed into a spiral configuration, with a coil of heating wire, not shown, housed inside the tube. The heating wire has an upper end thereof connected through a heater lead 17 to an electric supply equipment, not shown, which supply electricity to energize the heating wire inside the sheathed heater 14 for heating the connecting section C for purposes that will later be explained.

The sheathed heater 14 has a lower end thereof secured to the heater base 10 via a ring member 15 with bolts 16. The sheathed heater 14 is securely attached at an upper periphery there of to the cover flange 12. It is so designed that the spring alike sheathed heater 14 expands and contracts in axial direction in synchronization with the telescopic movement of the piston rod 9, the connecting rod 11 and the bellows 6.

The actuator 4 comprises a cylinder 4a in which the piston rod 9 reciprocates with a piston head 4b that is secured to an upper end of the piston rod 9 with a bolt 4c for simultaneous movement with the rod 9. Also, a fixed end section 4d is mounted at a lower portion of the cylinder 4a. The end section 4d is formed with a central hole through which the piston rod 9 is inserted to move into the cylinder 4a across the cover flange 12. The end section 4d thus serves to sealingly isolate the cylinder 4a. The piston head 4b is sized in diameter to freely movably fit inside the cylinder 4a for sliding movement with the piston rod 9.

The reciprocation of the piston rod 9 is effected by introducing compressed air into the cylinder 4a on either side of the piston head 4b, thereby pneumatically exerting pressure on the piston head 4b to force the piston rod 9 in axial direction.

Figure 2:
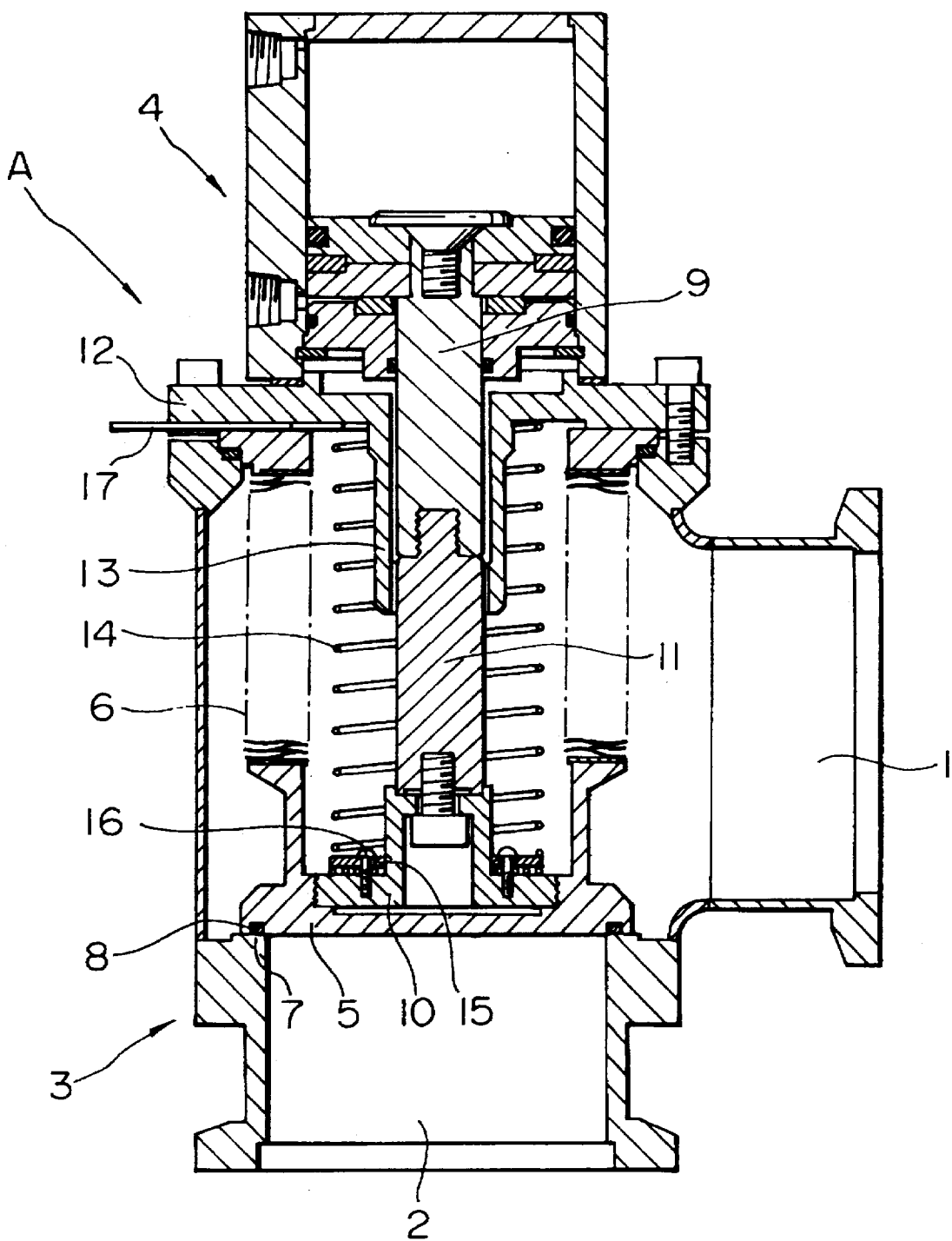
FIG. 2 is a cross-sectional side view of the vacuum exhause valve of FIG. 1 in its fully closed position.

To this aim, the actuator 4 may incorporate any known valve system, not shown, which flow air in and out of the cylinder 4a to pneumatically drive the piston head 4b and hence the piston rod 9. In such a system, air is flowed into the space of the cylinder 4a above the piston head 4b, forcing the piston head 4b to descend. This movement of the piston head 4b depresses the piston rod 9 and hence the interlocked connecting rod 11 which in turns presses the valve disk 5 against the valve seat 7 into a fully closed position of the valve A, as depicted in FIG. 2, where the flow of chemical vapor from the inlet port 1 to the outlet port 2 is interrupted.

With the connecting rod 11 descending, the corrugated bellows 6 and the spirally shaped sheathed heater 14 also expand in unison, thereby maintaining protective umbrella over the connecting section C.

The retraction of the piston rod 9 in the cylinder 4a is effected by exhausting the space defined above the piston head 4b, while simultaneously introducing air into the cylinder 4a below the piston head 4b, to exert upward pneumatic pressure on the back side of the piston head from below. The connecting rod 11 is thus forced to ascend, lifting the valve disk 5 away from the valve seat 7 into a fully opened position of the valve A, as depicted in FIG. 1. This restores the fluid-flow relationship between the inlet port 1 and the outlet port 2. With the upward travel of the connecting rod 11, the sheath heater 14 and the bellows 6 will also contract back to their neutral position.

It is designed so that the sheathed heater 14 radiates heat, through its inside heating wire, to keep the bellows 6 of the connecting section C warmed up, preferably at a stable temperature range between 180° and 200° C. As the sheathed heater 14 expands and contracts in synchronization with the bellows 6, uniformly and constantly keeping the latter at that temperature level. This arrangement serves to thermally prevent the external surfaces of the bellows 6 from potential adherence and deposition of chemical substances present in the flowing chemical vapor through the valve A.

The hollow metal tube shroud of the sheathed heater 14 provides effective protection to the inside heating wire, now shown, to thereby minimize wear and tear of the heating wire, which is exposed to constant strain and other external forces during its rapid telescopic movements inside the sheathed heater at work.

In addition, the thermal energy from the sheathed heater 14 transmits down the connecting rod 11 to the valve disk 5, keeping the valve disk 5 and the gasket 8 at a temperature range between 140° and 160° C., also to help reduce adherence and deposition of chemical substances in the surfaces of the valve disk 5 and gasket 8 during operation.

Furthermore, effective temperature control of the connecting section C would eliminate or, at least, effectively reduce the frequent need to clean the internal valve components, such as the bellows 6, gasket 8 and valve disk 5, possible with prior art vacuum exhaust valves, thus helping enhance the performance and the life time of the valve A.

Figure 3:
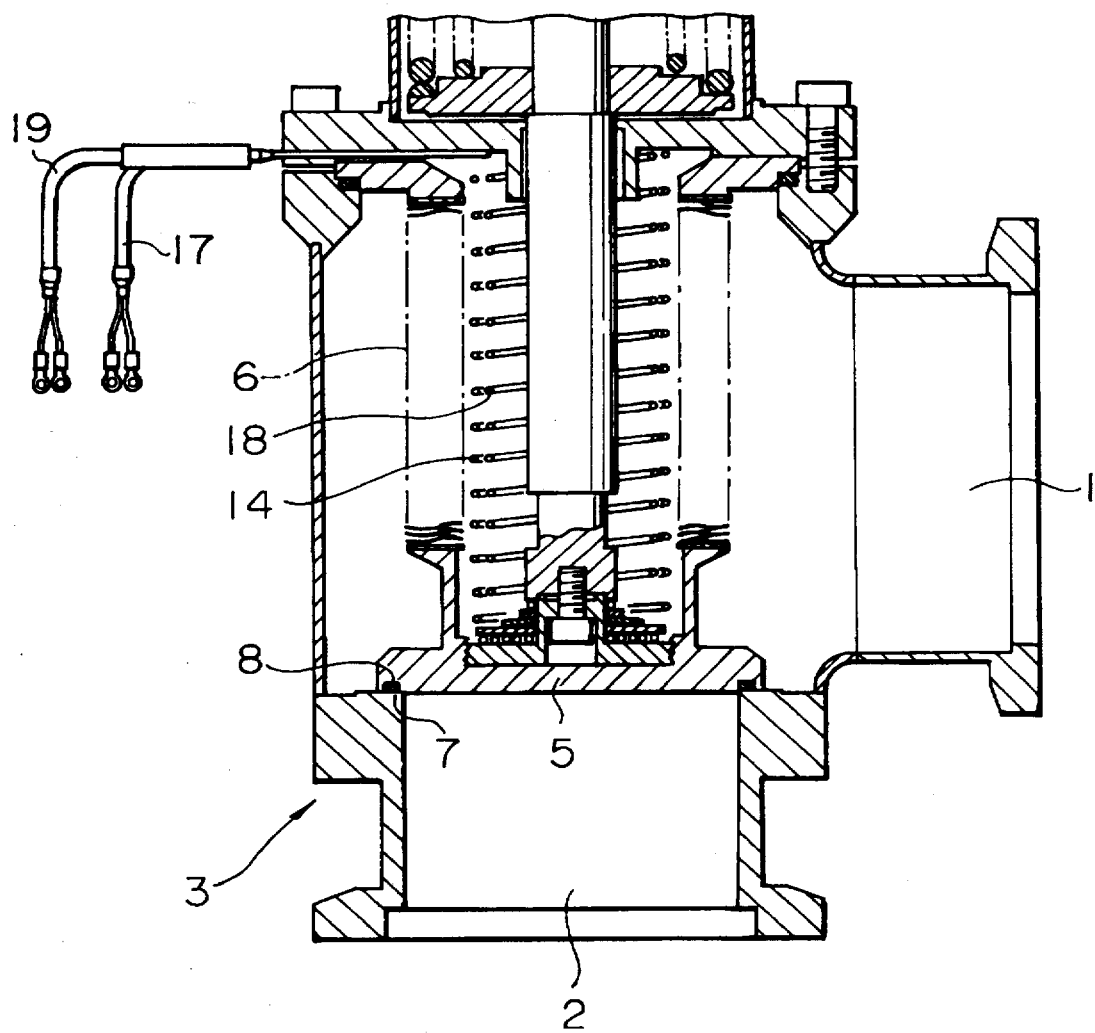
FIG. 3 is a cross-sectional side view of the vacuum valve designed in accordance with a second preferred embodiment of this invention.
Figure 4:
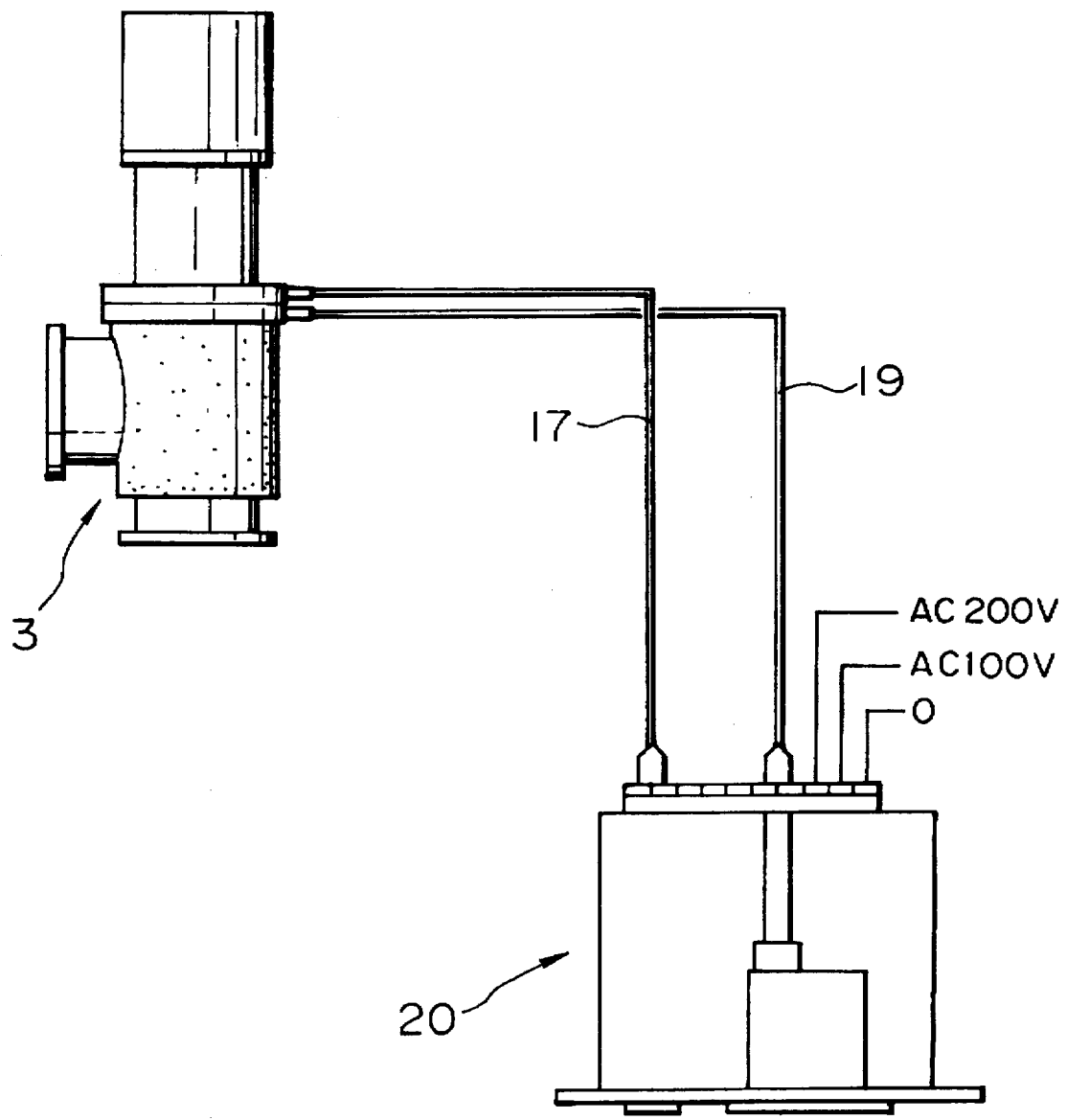
FIG. 4 is a schematic view illustrating a temperature control system for another preferred embodiment of the vacuum exhaust valve of the invention.

In another embodiment, as illustrated in FIGS. 3 and 4, installed in the connecting section C between the sleeve 13 and the sheathed heater 14, is a sheathed thermocouple 18 that is formed into a spiral shape to have the same axial length and same coil turns as the spiral sheathed heater 14. The sheathed thermocouple 18 is provided to measure the temperature inside the bellows 6. The sheathed thermocouple 18 is secured at a lower end thereof to the valve disk 5, and placed to stand with its individual coil turns aligned with those of the sheathed heater 14, so that the sheathed thermocouple 18 is physically immediately close to the sheathed heater 14 for better temperature sensibility.

The sheathed thermocouple 18 has an upper end thereof electrically connected through a thermocouple lead 19 to a temperature control device 20, which may be mounted situated outside the valve A. The temperature control device 20 is also connected through the heater lead 17 to the sheathed heater 14 which is governed by the temperature control device 20 to maintain a predetermined temperature through the sheathed thermocouple 18 measuring an operating environment temperature inside the bellows 6.

Figure 5:
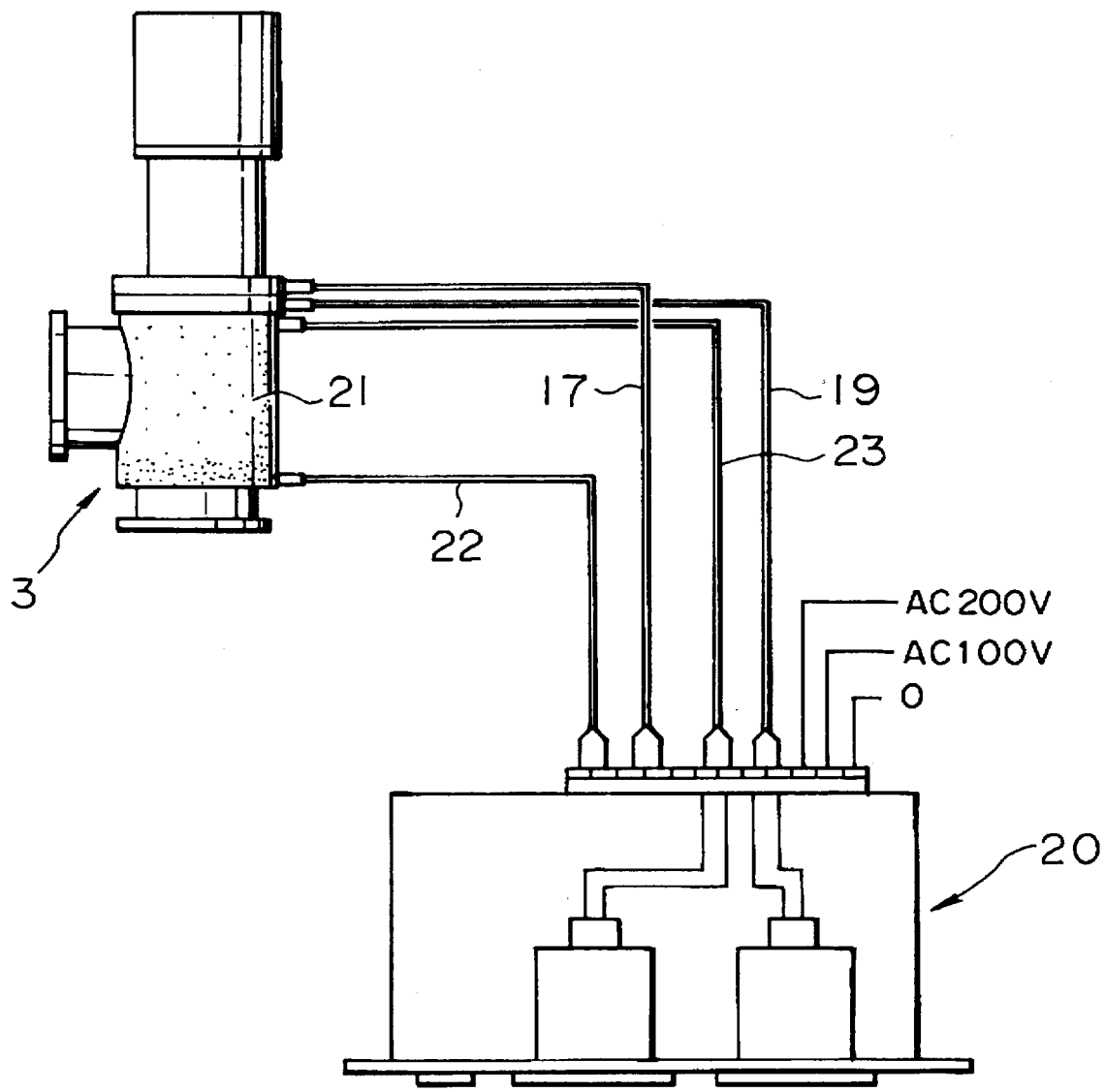
FIG. 5 is a schematic view depicting a modified version of the temperature control system of FIG. 4.
Figure 6:
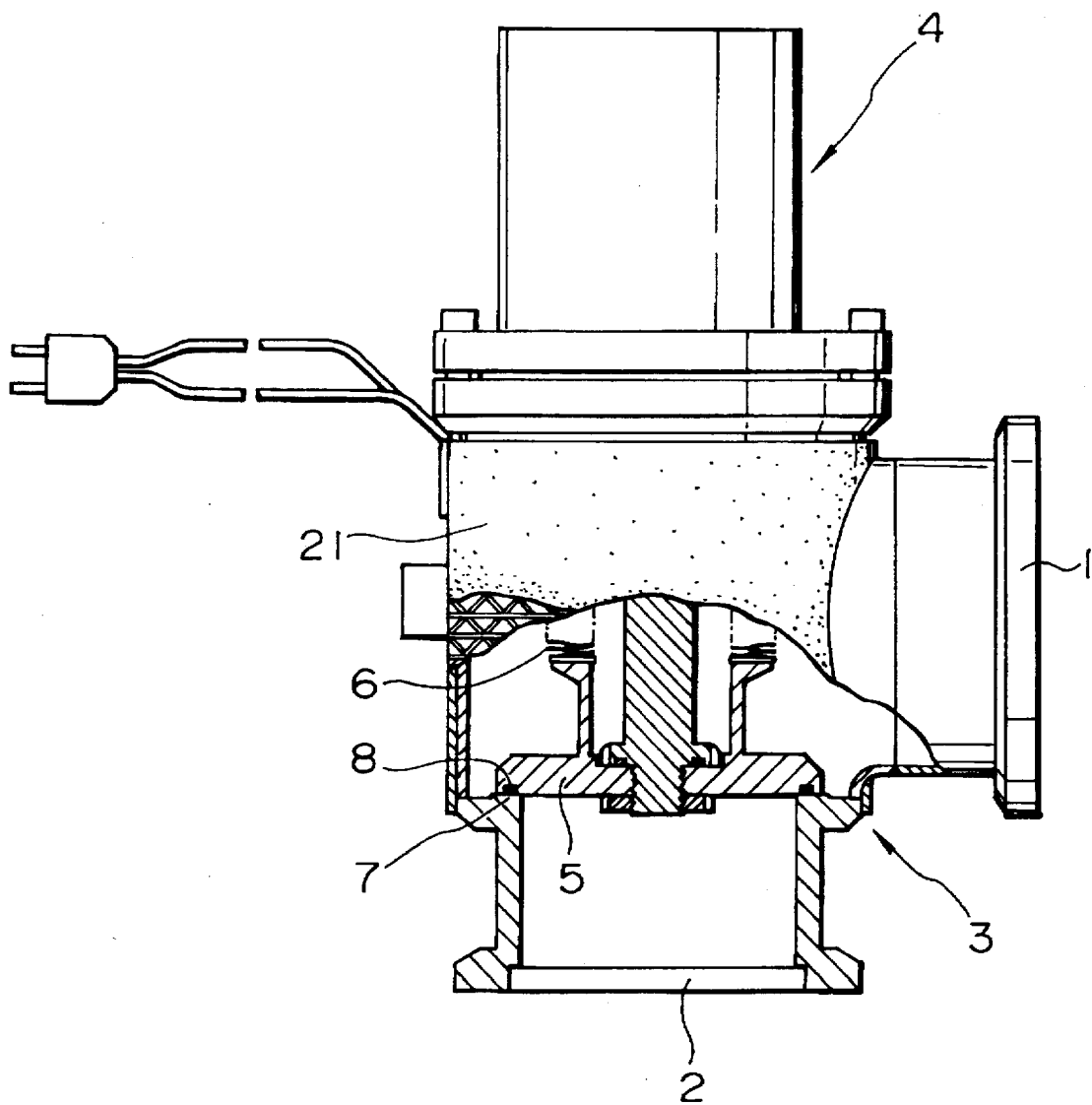
FIG. 6 is a partially broken away, side view of a vacuum exhaust valve of the prior art.

A third preferred embodiment of the present invention, as illustrated in FIG. 5, adds a rubber heater 21, which is mounted to enclose the valve casing 3 overall and provided to keep the bellows 6 of the connecting section C at high temperature levels. An additional thermocouple, not shown, may preferably be mounted inside the rubber heater 21 to measure the latter's temperature, and is operatively connected through a thermocouple lead 23 to the temperature control device 20 which is designed to control the rubber heater 21 for a predetermined temperature range in response to the second thermocouple through a heater lead 22.

The rubber heater 21 is provided to operate in unison with the sheathed heater 14, to enhance stable and effective temperature control for the bellows 6 and other core parts of the valve A.

It will be clear from the above description that the present invention will enhance the performance and service life of vacuum exhaust valves for CVD vacuum-operated exhaust systems by keeping the bellows, valve disk and gasket in desirable operating environment through the operation of a sheathed heater made of spirally shaped metal tube with a heating wire housed inside it, in conjunction with a temperature control device comprising a thermocouple installed in the sheathed heater for temperature measurement of the sheathed heater. The heating system is provided to minimize the potential risk of adherence and deposition of chemical substances in the surfaces of these valve components.

What is claimed is:

1. In a vacuum exhaust valve for chemical vapor deposition equipment, the valve having a valve casing, a fluid inlet port, a fluid outlet port, a valve disk vertically movably mounted in the valve body, a valve seat mounted also in the valve body between the inlet and outlet ports, an actuator mounted in the valve body and provided to move the valve disk in vertical direction away and into contact with the valve seat thereby establishing and blocking the passage of chemical vapor from the inlet port to the outlet port, and a bellows mounted to sealingly house the valve disk and vertically expandably disposed for expansion and contraction in synchronization with the vertical movement of the valve disk, improvements comprising a sheathed heater mounted in the valve casing inside the bellows and having an upper portion thereof fixedly secured to an upper end of the valve casing and a lower end fixed to the valve disk, the sheathed heater being made of a coiled hollow tube and vertically expandably disposed for synchronized expansion and contraction with the bellows, the sheathed heater having a heating wire inserted into its hollow inside for heating the bellows and valve disk.

2. In a valve as set forth in claim 1, wherein a sheathed thermocouple is mounted inside the sheathed heater for temperature detection of the sheathed heater and formed into a spiral configuration to have the same coil turns as the spiral sheathed heater, the sheathed thermocouple being installed to have its coil turns leveled with the sheathed heater to thereby obtain physical affinity with the sheathed heater for enhanced temperature sensibility, the sheathed thermocouple having an upper portion thereof secured to an upper end of the valve casing and a lower portion fixed to the valve disk.

3. In a valve as set forth in claim 2, wherein a temperature control device is mounted externally the valve casing, the sheathed thermocouple and the sheathed heater being operative connected to the temperature control device through a separate lead wire for temperature control of the valve inside.

4. In a valve as set forth in claim 3, wherein a rubber heater is mounted around the valve casing, with another thermocouple being installed inside the bellows for temperature detection of the valve inside, the rubber heater and the second thermocouple being operatively connected to the temperature control device through a separate lead wire for temperature control of the valve inside.

* * * * *